(12) United States Patent
Pinkovezky et al.

(10) Patent No.: US 10,445,701 B2
(45) Date of Patent: Oct. 15, 2019

(54) GENERATING COMPANY PROFILES BASED ON MEMBER DATA

(71) Applicant: Microsoft Technology Licensing, LLC, Redmond, WA (US)

(72) Inventors: Aviad Pinkovezky, Los Altos, CA (US); Huining Feng, Cupertino, CA (US); Michael Brentley Dimapilis, Sunnyvale, CA (US); Viman Deb, San Jose, CA (US); Jingjing Huang, Santa Clara, CA (US); Timothy Vergara Santos, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 756 days.

(21) Appl. No.: 14/602,120

(22) Filed: Jan. 21, 2015

(65) Prior Publication Data

US 2016/0132832 A1    May 12, 2016

Related U.S. Application Data

(60) Provisional application No. 62/076,433, filed on Nov. 6, 2014.

(51) Int. Cl.
| | | |
|---|---|---|
| *G06Q 10/10* | (2012.01) | |
| *G06Q 50/00* | (2012.01) | |
| *H04W 4/21* | (2018.01) | |
| *H04L 29/06* | (2006.01) | |

(52) U.S. Cl.
CPC ......... *G06Q 10/1053* (2013.01); *G06Q 50/01* (2013.01); *H04L 63/08* (2013.01); *H04W 4/21* (2018.02)

(58) Field of Classification Search
USPC ....................................................... 705/319
See application file for complete search history.

(56) References Cited

U.S. PATENT DOCUMENTS 8,849,812 B1 * 9/2014 Mukherjee ............. G06Q 30/02
                                                             707/728
2006/0129452 A1   6/2006 Nordberg et al.
(Continued)

OTHER PUBLICATIONS

Arif, Tasleem; Ali, Rashid; Asger, M. International Journal of Computer Applications; New York vol. 95, Iss. 1, (2014). DOI:10.5120/16558-3964 (Year: 2014).*

(Continued)

*Primary Examiner* — Andrew B Whitaker
(74) *Attorney, Agent, or Firm* — Schwegman Lundberg & Woessner, P.A.

(57) ABSTRACT

Techniques for automatically generating a company profile in a social network are described. A profile generation module can access employment data from a member profile in a social network. Additionally, the profile generation module can determine an employer based on the accessed employment data. Furthermore, the profile generation module can verify that the determined company does not have an existing entity profile in the social network. Moreover, the profile generation module can authenticate the verified employer based on member data from the social network. Subsequently, the profile generation module can generate and post the entity profile on the social network.

16 Claims, 6 Drawing Sheets

(56) References Cited

U.S. PATENT DOCUMENTS

| | | | |
|---|---|---|---|
| 2007/0218900 A1* | 9/2007 | Abhyanker | G06Q 10/087 455/435.1 |
| 2008/0162580 A1 | 7/2008 | Ben Harush | |
| 2009/0049010 A1 | 2/2009 | Bodapati | |
| 2010/0268705 A1 | 10/2010 | Douglas et al. | |
| 2012/0084280 A1 | 4/2012 | Bouzas et al. | |
| 2013/0151606 A1* | 6/2013 | Piepgrass | G06Q 30/02 709/204 |
| 2013/0268373 A1 | 10/2013 | Grishaver | |
| 2014/0089780 A1* | 3/2014 | Garcia-Martinez | G06F 17/00 715/234 |
| 2014/0379741 A1* | 12/2014 | Lai | G06Q 50/01 707/758 |
| 2015/0067777 A1* | 3/2015 | Heise | H04L 63/08 726/3 |
| 2016/0350877 A1 | 12/2016 | Pinkovezky et al. | |

OTHER PUBLICATIONS

"U.S. Appl. No. 14/788,705, Examiner Interview Summary dated Dec. 1, 2015", 3 pgs.

"U.S. Appl. No. 14/788,705, Final Office Action dated Dec. 4, 2015", 13 pgs.

"U.S. Appl. No. 14/788,705, Non Final Office Action dated Aug. 20, 2015", 12 pgs.

"U.S. Appl. No. 14/788,705, Response filed Nov. 20, 2015 to Non Final Office Action dated Aug. 20, 2015", 13 pgs.

"U.S. Appl. No. 15/146,344, Non Final Office Action dated Jul. 19, 2018", 11 pgs.

"Applicant Initiated Interview Summary Issued in U.S. Appl. No. 15/146,344", dated Aug. 28, 2018, 4 pages.

"Applicant Initiated Interview Summary Issued in U.S. Appl. No. 15/146,344", dated Mar. 14, 2019, 3 pages.

"Final Office Action Issued in U.S. Appl. No. 15/146,344", dated Jan. 31, 2019, 7 pages.

* cited by examiner

GENERATING COMPANY PROFILES BASED ON MEMBER DATA

This application claims the priority benefit of U.S. Provisional Application No. 62/076,433, filed Nov. 6, 2014.

TECHNICAL FIELD

The subject matter disclosed herein generally relates to the processing of data in a social network system. Specifically, the present disclosure generally relates to techniques for generating a company profile in a social network system based on information derived from member profiles. For example, techniques are described to generate a company profile based on employer information in member profiles on the social network system.

BACKGROUND

Social media and networking websites can maintain information on companies, organizations, employees, and employers. The information may involve firmographic information, such as information identifying a headquarters of a company, a hierarchical structure of a company or organization (such as identifying a subsidiary), and the like. Often, some useful firmographic information may be missing or otherwise unavailable.

BRIEF DESCRIPTION OF THE DRAWINGS

Some embodiments are illustrated by way of example and not limitation in the figures of the accompanying drawings.

DETAILED DESCRIPTION

Figure 1:
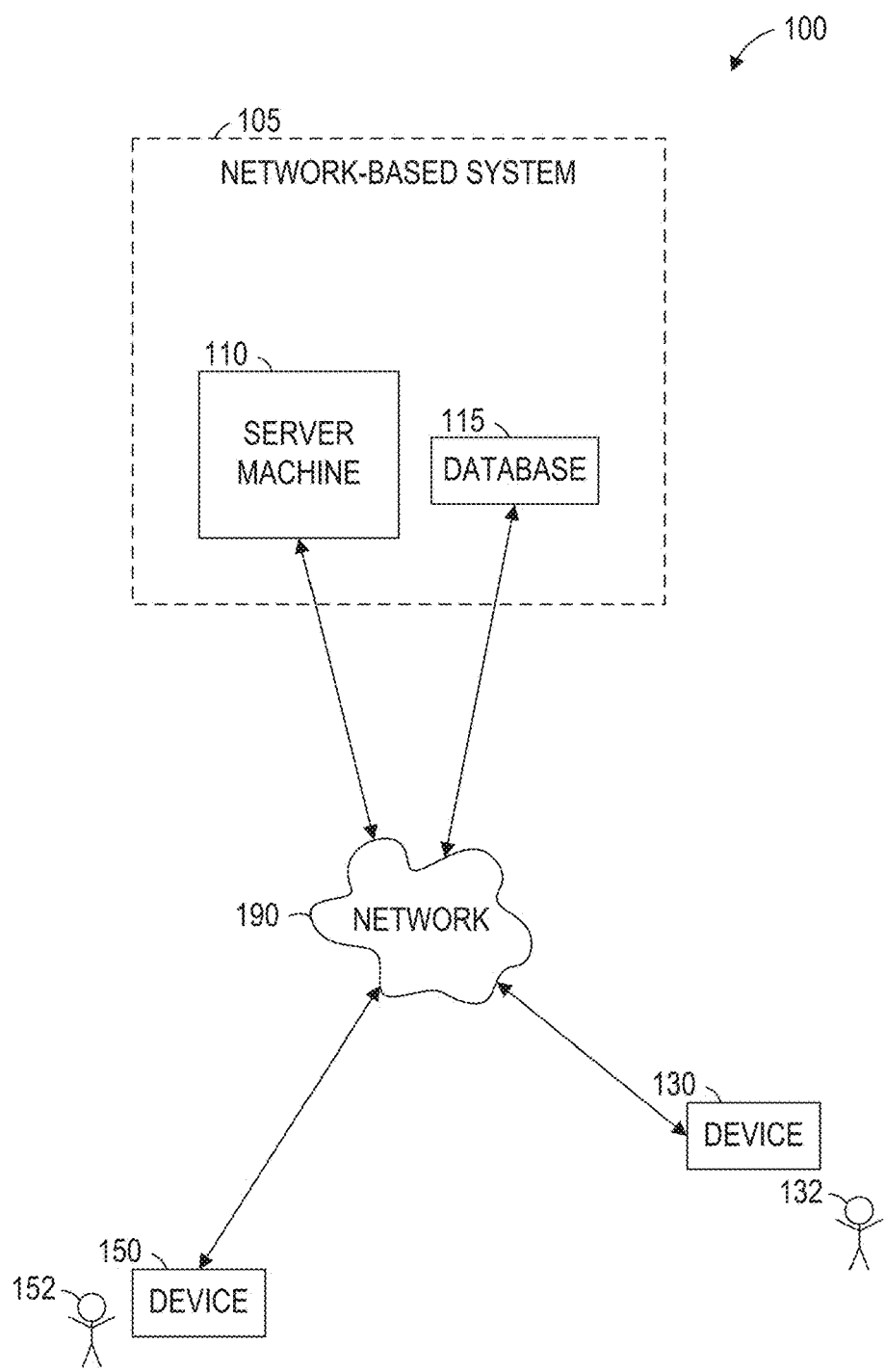
FIG. 1 is a network diagram illustrating a network environment suitable for a social network, according to some example embodiments.

A member of a social network can create a member profile. The member profile can include a location associated with the member and an entity (e.g., employer) associated with the member. In addition to member profiles, a social network can have entity profiles (e.g., company pages) with information relating to an entity, which may also include associated members (e.g., employees), office locations, and number of employees. In some instances, the social network may have an omitted entity profile. The omitted entity profile can be an entity profile for a valid entity (e.g., company) that has yet to be created in the social network. Techniques described herein allow for the automatic generation of an omitted entity profile for a valid entity based on data from the member profiles.

In current implementations, an entity profile may include firmographic information. Firmographic information about an entity can include a name of the entity, associated members, office locations of the entity, and a website of the entity.

However, the social network may have omitted entity profiles. For example, a valid entity (e.g., small company) may have employees as members of the social network, but the valid entity may lack an entity profile on the social network. By using the information accessed from the member profiles associated with the valid entity, a profile generation module can generate an entity profile with firmographic information for the valid entity.

Using social graph information in the social network, embodiments of the present disclosure can determine firmographic information. Firmographic information can be information that is not easily ascertained from the public domain, such as, but not limited to, age of company, size of company, ownership of company, partnership between different companies, geographic locations (e.g., distribution center, headquarters), market, position, stage, trends, customers, property, parent company, and subsidiaries of a company. For example, privately held companies or closed corporations may not have publicly released firmographic information.

Furthermore, firmographic information can be a set of characteristics associated with an entity. Firmographic information can be specialized to entities in a particular industry. Moreover, firmographic information can allow for comparison of entities in a similar industry.

Techniques described herein can automatically generate an entity profile for a valid entity without a profile on the social network. Additionally, the entity can be validated and verified based on member profile data. Furthermore, a member profile associated with the entity can be determined to be the administrator of the automatically generated entity profile.

According to some embodiments, an entity profile can be created based on entity information determined from member profile data. For example, a member profile can include the name of the member's employer and the member's location, but the employer may not have created an entity profile on the social network.

The entity information can be determined based on information accessed from member profiles. The entity information can include entity name, entity locations, website associated with the entity, country associated with the entity, region associated with the entity, industry associated with the entity, ZIP code associated with the entity, and number of members.

For example, when the entity is a company, the company profile can include information relating to the company's name, the office locations of the company (e.g., country, region, city, state, ZIP code), the website of the company, the industry associated with the company, and the number of employees with the company.

As previously mentioned, firmographic information can be determined through member profile data, which include connections (e.g., first-degree, second-degree) between members.

Example methods and systems are directed to techniques for determining firmographic information based on member profile data and social graph data. More specifically, the present disclosure relates to methods, systems, and computer program products for generating a company profile page for a company without a profile page on the social network. Techniques for determining a valid company based on the social network of the company's employees are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for a social network service, according to some example embodiments. The network environment 100 includes a server machine 110, a database 115, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store member data (e.g., profile data, social graph data) for the social network service. The server machine 110, the first device 130, and the second device 150 may each be implemented in a computer system, in whole or in part, as described below with respect to FIG. 6.

Also shown in FIG. 1 are the users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 6. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
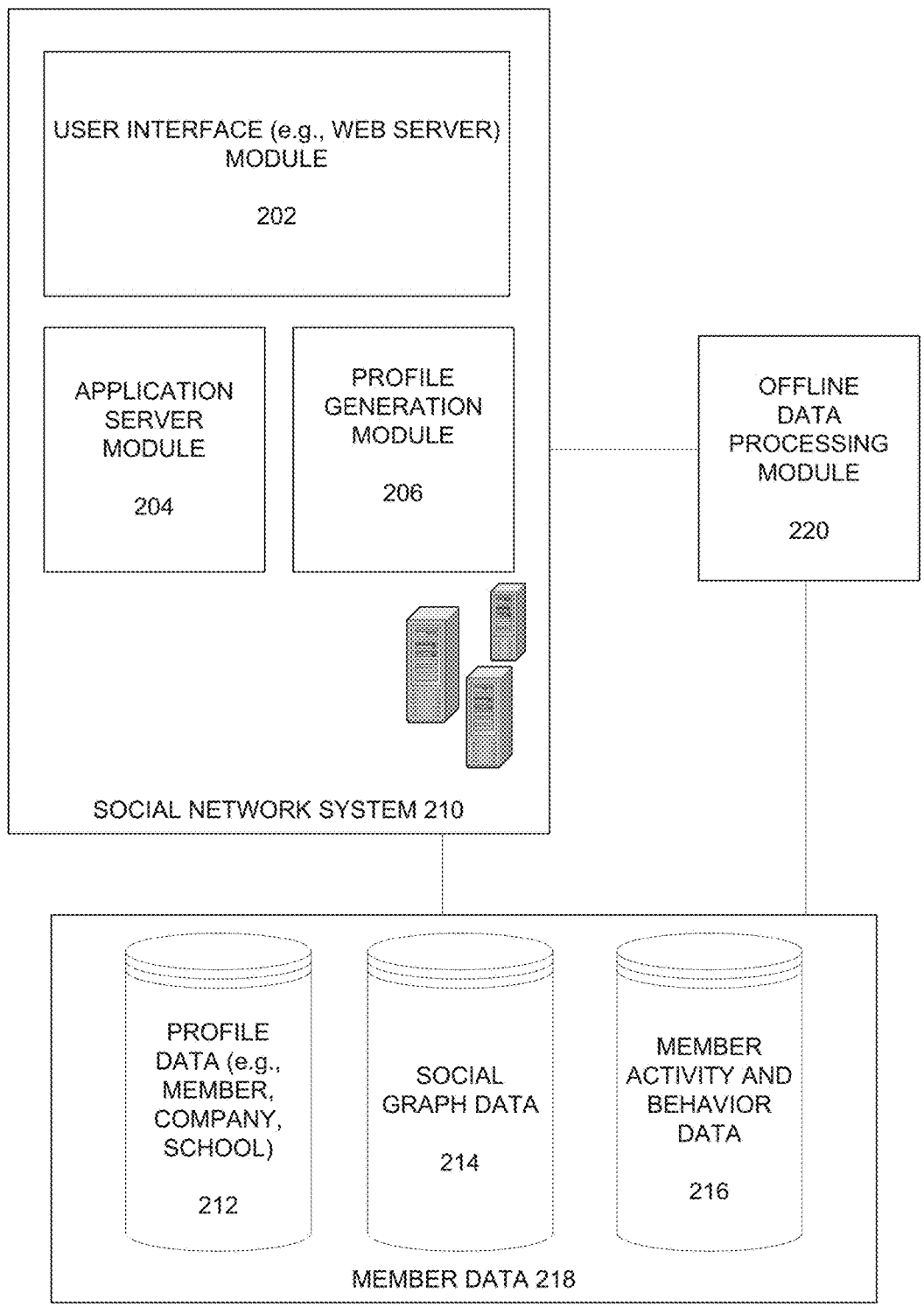
FIG. 2 a block diagram illustrating various modules of a social network service, according to some example embodiments.

FIG. 2 is a block diagram illustrating components of a social network system 210, according to some example embodiments. The social network system 210 is an example of a network-based system 105 of FIG. 1. The social network system 210 can include a user interface module 202, an application server module 204, and a profile generation module 206, all configured to communicate with each other (e.g., via a bus, shared memory, or a switch).

Additionally, the social network system 210 can communicate with the database 115 of FIG. 1, such as a database storing member data 218. The member data 218 can include profile data 212, social graph data 214, and member activity and behavior data 216. Using the member data 218, a valid entity with an omitted entity profile can be determined.

In some instances, the profile generation module 206 can be configured to process data offline or periodically using an offline data processing module 220. For example, the offline data processing module 220 can include Hadoop servers that access the member data 218 periodically (e.g., on a nightly basis). Processing the member data 218 may be computationally intensive; therefore, due to hardware limitations and to ensure reliable performance of the social network, the determination of a valid entity may be done offline.

Figure 3:
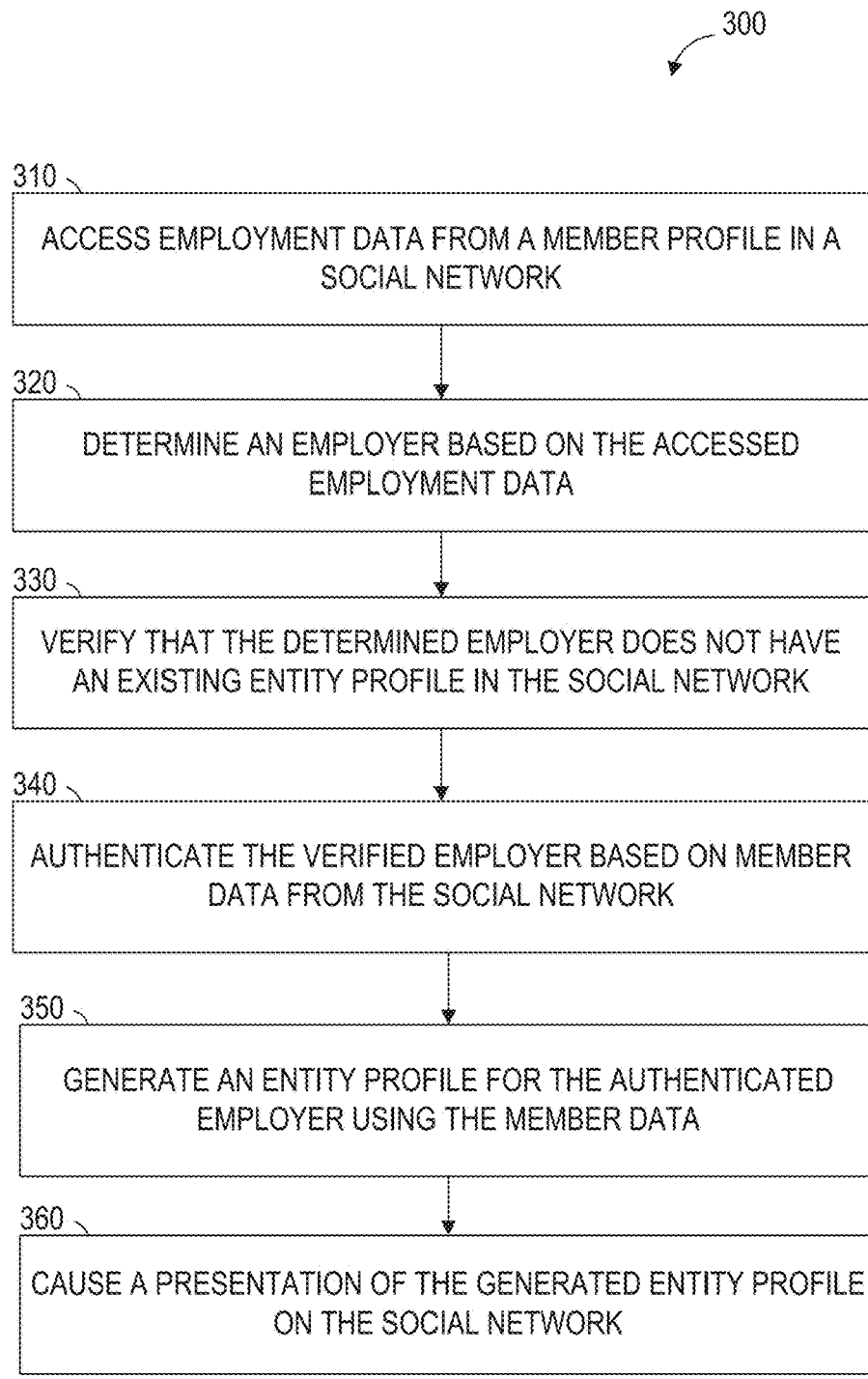
FIG. 3 is a flowchart illustrating a method for generating an entity profile based on member data, according to some example embodiments.
Figure 4:
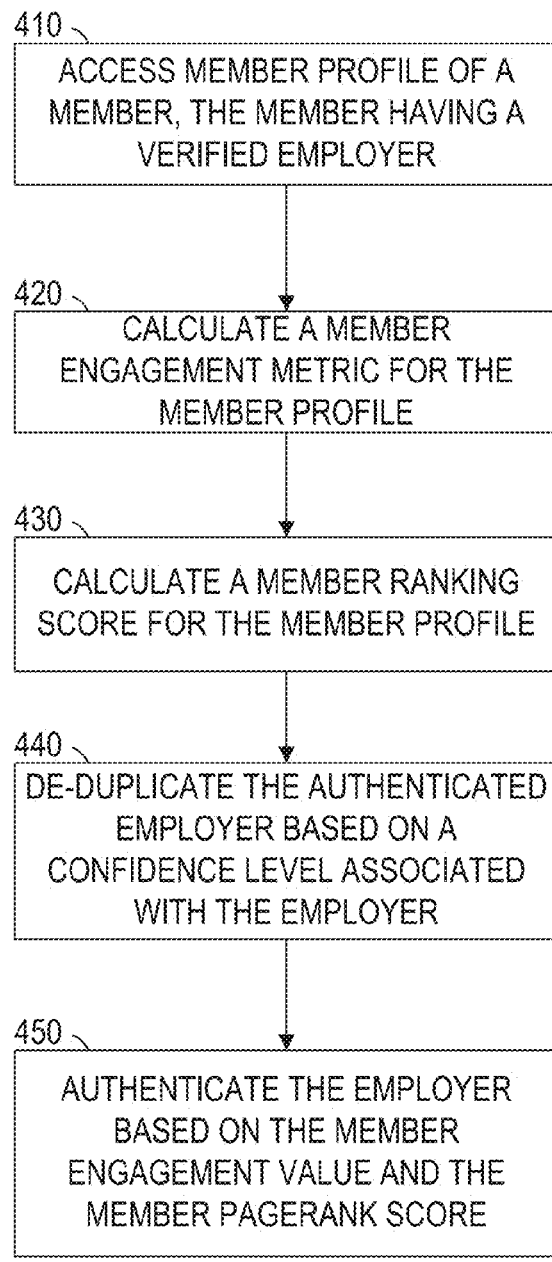
FIG. 4 is a flowchart illustrating a method for authenticating a verified employer, according to some example embodiments.

As will be further described with respect to FIGS. 3-4, the profile generation module 206 in conjunction with the user interface module 202 and the application server module 204 can generate an entity profile for a valid entity using the member data 218.

Any one or more of the modules described herein may be implemented using hardware (e.g., one or more processors of a machine) or a combination of hardware and software. For example, any module described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

As shown in FIG. 2, database 115 can include several databases for member data 218. The member data 218 includes a database for storing the profile data 212, including both member profile data and profile data for various organizations. Additionally, the member data 218 can store the social graph data 214 and the member activity and behavior data 216.

In some embodiments, the member data 218 may be processed (e.g., real-time, background/offline) using the profile generation module 206 to determine a valid entity with an omitted entity profile on the social network system 210. For example, if a member has provided information about various jobs the member has held with the same or different companies, and the physical location, this information can be used to determine an omitted entity profile.

The profile data 212 can be used to determine entities (e.g., company, organization) associated with a member. For instance, with many social network services, when a user registers to become a member, the member is prompted to provide a variety of personal and employment information that may be displayed in the member's personal web page. Such information is commonly referred to as profile data 212. The profile data 212 that is commonly requested and displayed as part of a member's profile includes the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on.

In some embodiments, the profile data 212 may include the various skills that each member has indicated he or she possesses. Additionally, the profile data 212 may include skills for which a member has been endorsed.

With certain social network services, such as some business or professional network services, the profile data 212 may include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

Another example of the profile data 212 can include data associated with an entity profile (e.g., company page). For example, when a representative of an entity initially registers the entity with the social network service, the representative may be prompted to provide certain information about the entity. This information may be stored, for example, in the database 115 and displayed on an entity page.

As previously discussed, the profile generation module 206 can generate an entity profile to be stored as part of the profile data 212 for a valid entity which does not have an entity profile in the social network system 210.

Additionally, social network services provide their users with a mechanism for defining their relationships with other people. This digital representation of real-world relationships is frequently referred to as a social graph. As will be described later, the social graph data 214 can be used to determine the validity of an entity.

In some instances, the social graph data 214 can be based on a member's presence within the social network service. For example, consistent with some embodiments, a social graph is implemented with a specialized graph data structure in which various members are represented as nodes connected by edges. The social graph data can be used by the profile generation module 206 to determine the authenticity of a member's profile page. An entity having a missing entity page can be validated based on the determined authenticity of the member's profile page.

Once registered, a member may invite other members, or be invited by other members, to connect via the social network service. A "connection" may include a bilateral agreement by the members, such that both members acknowledge the establishment of the connection. The connection relationship data can be stored in the social graph data 214.

Similarly, in some embodiments, a member may elect to "follow" another member. In contrast to establishing a connection, the concept of "following" another member typically is a unilateral operation, and at least in some embodiments, does not require acknowledgement or approval by the member being followed. When one member follows another, the member who is following may receive status updates or other messages published by the member being followed, or relating to various activities undertaken by the member being followed. According to some embodiments, follow data can be stored in the social graph data 214 and can be used to determine if the member profile is authentic.

In addition to hosting a vast amount of social graph data 214, many social network services maintain member activity and behavior data 216.

In some instances, the member activity and behavior data 216 can determine the authenticity of a member's profile page. The member activity and behavior data 216 can include profile page views, entity page views, newsfeed postings, and clicking on links on the social network system 210. For example, when the member activity and behavior data 216 includes page views of members and entities in the same industry or job function, then the member profile has a higher probability of being authentic.

The social network service may provide a broad range of other applications and services that allow members the opportunity to share and receive information, often customized to the interests of the member. In some embodiments, members may be able to self-organize into groups, or interest groups, organized around subject matter or a topic of interest. In some embodiments, the social network service may host various job listings providing details of job openings with various organizations.

Online or web-based social network services can use member data (e.g., profile data 212, social graph data 214, member activity and behavior data 216) to determine whether a member or an entity is authentic.

FIG. 3 is a flowchart illustrating operations of the profile generation module 206 in performing a method 300 for generating an entity profile for a valid entity with a profile on a social network, according to some example embodiments. Operations in the method 300 may be performed by the network-based system 105, using modules described above with respect to FIG. 2. As shown in FIG. 3, the method 300 includes operations 310, 320, 330, 340, 350, and 360.

In some instances, the profile generation module 206 can group all member profiles that list Company A as their employer. These member profiles can be included in an entity group for Company A. Additionally, separate subgroups of the entity group for Company A can be created based on the different office locations of Company A. Furthermore, an authenticity confidence level for Company A can be determined. When the minimum confidence level is surpassed, the profile generation module 206 can generate a company profile for Company A. Subsequently, the generated company profile can be posted on the social network system 210. In some instances, the profile generation module 206 can determine a member profile to administer the generated company profile on the social network system 210.

At operation 310, the profile generation module 206 can access employment data from a member profile in the social network system 210. The employment data can be accessed from the database 115 (e.g., member data 218) using the network 190.

The profile generation module 206 can access the member data 218 to access the employment data of a member. For example, the profile generation module 206 can access the profile data 212 of a member profile to get the employment data. As previously mentioned, the employment data includes a person's education, the company at which a person is employed, the location of the employer, an industry in which a person is employed, a job title or function, an employment history, skills possessed by a person, and professional organizations of which a person is a member.

At operation 320, the profile generation module 206 can determine an employer based on the accessed employment data. Employment data can include the employer of a member and the timeframe of the employment. For example, using the name of the employer that the member is employed at, the profile generation module 206 can determine the employer (e.g., company).

At operation 330, once the employer is determined, the profile generation module 206 can verify that the determined employer does not have an existing entity (e.g., company) profile in the social network system 210. For example, using the company name, company uniform resource locator (URL), company location, or industry associated with the company, the profile generation module 206 can search for the company profile in the profile data 212. The location can include country, state, city, region, ZIP code, and street address. When a company profile associated with the determined company is not returned during the search at operation 330, the determined employer is verified to not have an entity profile. A company without a company page on the social network is an example of an employer that does not have an entity profile.

At operation 340, the profile generation module 206 can authenticate the verified employer based on member data 218 from the social network system 210. For example, the employer can be authenticated based on a member engagement value or a member ranking score for the member. Method 400 of FIG. 4 further describes methods for authenticating the verified company. In some instances, the authentication can occur after the employer has been determined in operation 320.

At operation 350, the profile generation module 206 can generate an entity profile (e.g., company page) for the authenticated employer using the member data 218. For example, when the employer is a company, the profile generation module 206 can generate a company page on the social network system 210 based on information (e.g., member data 218) accessed from members associated with the authenticated company.

In one example, the generated company profile page may be stored in the profile data 212, but not accessible (e.g., exposed) to the public until an analyst verifies the company profile at operation 360.

In another example, the generated company profile page can be accessible to the public after an automated validation, de-duplication, and enrichment process based on the member data 218. The enrichment process includes adding addition information to the company profile page based on information derived from the member data 218. In this example, an analyst is not needed to verify the company profile before making the company profile accessible to the public.

In yet another example, the generated company profile page is verified (e.g., validated and de-duplicated) and enriched using crowdsourcing techniques. In this example, an analyst is not needed to verify the company profile before making the company profile accessible to the public.

At operation 360, the profile generation module 206 can cause a presentation (e.g., post) of the generated entity profile on the social network system 210. In some instances, an analyst can validate the generated company profile page, which results in the generated company profile page being accessible to the public. In other instances, the generated company profile page is validated based on information derived from the member data 218, or crowdsourcing techniques.

In some instances, the profile generation module 206 can determine an administrator for the generated company profile. For example, using member data (e.g., employee title), the profile generation module 206 can request a specific member (e.g., president of the company) to act as the administrator of the company profile. Furthermore, algorithm and machine-learning techniques are used to determine which members to request to manage the company profile page. In one algorithm, members that are assumed to be closely related to the company (e.g., based on operations 420 and 430, described with respect to FIG. 4) have a higher probability of becoming an administrator. Additionally, members that are assumed to be more trustworthy (e.g., authentic member profile) have a higher probability of becoming an administrator.

FIG. 4 is a flowchart illustrating operations of the profile generation module 206 in performing a method 400 for authenticating a company based on profile data from the social network system 210, in accordance with another embodiment of the present disclosure. Operations in the method 400 may be performed by the network-based system 105, using modules described above with respect to FIG. 2. As shown in FIG. 4, the method 400 includes operations 410, 420, 430, 440, and 450.

In some instances, the profile generation module 206 can determine a number of member profiles associated with the determined company. The profile generation module 206 can access the member data 218 to verify that each member profile associated with the determined company represents an actual employee of the company by using the social graph data 214 (e.g., connections between employees). For example, the employees of the determined company may be well connected if the connection density is above a threshold value, which would imply that the member is an actual employee. Accordingly, when a minimum confidence level is not met, the profile generation module 206 may infer that the employees do not know each other, and the relationship between the company and employees may not be authenticated. The authentication of the employees associated with the determined company can be based on location and on behavior indicators from the member activity and behavior data 216.

At operation 410, the profile generation module 206 can access a member profile of a member from the member data 218. The member can have a verified employer as previously discussed in method 300. The user interface module 202, application server module 204, and profile generation module 206 in the social network system 210 are configured to communicate with each other (e.g., via a bus, shared memory, or a switch) to access the member profile from the database 115.

At operation 420, the profile generation module 206 can calculate a member engagement value (e.g., member engagement metric). The member engagement value can be calculated based on the member data 218, which includes the member activity and behavior data 216. For example, when a member is active on the social network system 210, the member profile has a higher probability of being authentic and being an employee of a company identified on the member profile. The activity of a member is measured using the member engagement value based on member engagement and usage. The member engagement metric is determined based on how often the user uses the social network system 210 (e.g., include profile page views, entity page views, newsfeed postings, and clicking on links). Additionally, the member engagement metric can be based on the level of the member's profile completeness.

At operation 430, the profile generation module 206 can calculate a member ranking score for the member. The member ranking score can be based on third-party pagerank data. In some instances, the pagerank data can be stored in the member data 218. Additionally, the profile generation module 206 can compute the member ranking score based on the social graph data 214. For example, when a member in a given entity is highly influential in the social graph, then the member profile has a higher probability of being authentic. The member ranking score can be measured using the social graph data 214, such as the number of connections (e.g., first degree and second degree) and the number of followers. Furthermore, the member ranking score can be based on the number of unique visitors that the member profile page receives.

In some instances, the determined member ranking score for the member from operation 430 and the generated member engagement value from operation 420 can be stored as part of the member data 218.

At operation 440, the profile generation module 206 can de-duplicate a verified employer based on a confidence level associated with the employer. The verified employer can be based on operation 330. The member profile can be the same member profile from operation 310 and 410.

In some instances, in order to ensure that two company profiles are not generated for the same company, a validated company is de-duplicated (e.g., removed) from the automatic company profile generation process. For example, it may be determined in operation 330, described above with respect to FIG. 3, that determined company A and determined company B may have overlapping members. When the confidence score for a duplicate company is above a threshold, the profile generation module 206 does not generate a company profile for the duplicate company. Continuing with the example, a first member may be associated with Company A with a 90% confidence level, the first member may be associated with Company B with an 89% confidence level, and the first member may be associated with Company C with a 40% confidence level. In some instances, the first member can be associated with only one company; therefore, the profile generation module 206 can determine that Company C is not the employer of the first member. However, because the confidence level for Companies A and B is above a predetermined level (e.g., 70%), the profile generation module may now determine if Companies A and B are the same company by using the member data 218. If validated Companies A and B are the same company, then a company profile page is generated for only one of the companies. For example, if Companies A and B have the same website URL, it can be assumed that they are one company, and therefore the company profile may be generated only for Company A because of the higher confidence level associated with Company A.

In some instances, when a company is determined to be a duplicate, the profile generation module 206 updates the method 300 to remove other determined companies from the automatic company profile generation process.

At operation 450, the profile generation module 206 can authenticate the employer associated with the member from method 300 based on the generated member engagement value and the member ranking score. The authenticated employer can then have an entity profile generated by the profile generation module 206 at operation 450. Additionally, a verified employer that is de-duplicated is not authenticated, and therefore, an entity profile is not generated at operation 450 for the de-duplicated employer.

In some example embodiment, the company can be validated based on the member engagement value or the member ranking score. Furthermore, after the employer is authenticated, the profile generation module 206 can use the member data 218 to confidently (e.g., 95% confidence level) infer company attributes (e.g., number range of employees at a specific location) based on information derived from the member data 218.

Figure 5:
FIG. 5 is a user interface diagram illustrating an example of a company page presenting information about a company, according to some example embodiments.

FIG. 5 is a user interface diagram illustrating an example of an entity profile (e.g., a company page) 500 presenting various information about a company, including an activity stream showing various messages or status updates published, on behalf of the company, by authorized representatives of the company, consistent with some embodiments. As illustrated in FIG. 5, the example company page is for a company with the name ACME Products. In this example, the company page 500 for ACME Products is hosted by the social network system 210. However, in alternative embodiments, a third party or the company itself may host the company page. In any case, members of the social network service who may be interested in the company can access the company page 500 for ACME Products to view a variety of information about the company.

For instance, in the example of FIG. 5, the company page 500 for ACME Products presents a brief history and background of the company 510, as well as information about the number of followers 520 (e.g., members who are following the company). In the background section of the company, the company size 530, and URL 535 of the company can be presented. As described with respect to FIGS. 2-4, the profile generation module 206 using the method 300 can automatically generate the company page 500 based on the member data 218. Additionally, the profile generation module 206 using the method 400 can verify the member information used in the method 300 to generate the company page 500.

Consistent with some embodiments, the company page 500 may include a navigation bar with a variety of tabs relating to specific topical categories. For instance, in the example of FIG. 5, the company page for ACME Products includes a navigation bar showing tabs for "Overview," "Careers," "Follower Statistics," "Page Statistics," "Products/Services," and "Insights" 540. In some embodiments, selecting a particular tab will cause the content of the page to change, such that content relating to the selected tab is presented. Similarly, the content may be personalized based on the identity of the member viewing the content, such that an authorized administrator or representative of the company may view certain information that is not viewable by ordinary members.

In some embodiments, the company page 500 may include a tab associated with content relating to various insights about the company as derived from the member data 218. For example, in connection with the "Insights" 540 tab in the example web page of FIG. 5, a viewing member may be presented with information identifying members of the social network service who are employed at ACME Products and who have new job titles, or information about members who have recently departed ACME Products for a new company. In addition, the viewing member may be presented with information, calculated using the method 300, and verified using the method 400, about the number of members of the social network service who are in the viewing member's social graph (e.g., first-degree or direct connections, followers, etc.) and who are employed at ACME Products. The company page 500 may present statistical information about the geographical location of residences of the employees of the company. Of course, other insightful information may be presented as well, such as the top companies that employees of ACME Products went to subsequent to departing ACME Products.

Referring again to FIG. 5, various items of content are shown in separate content modules. In the portion of the example user interface with company updates 550, the company page presents a user interface for a data feed, generally referred to as an activity stream, content stream, or company updates stream, via which messages or status updates published on behalf of the company are presented.

According to various example embodiments, one or more of the methodologies described herein may facilitate automatic generation of company profile pages. With regards to marketing or other purposes, such firmographic information can be valuable for a sales team to find a company in a specific industry and the members associated with the company. Firmographic information can include age of company, size of company, ownership of company, partnership between different companies, geographic locations (e.g., distribution center, headquarters), market, position, stage, trends, customers, property, parent company, and subsidiaries of a company.

When these effects are considered in aggregate, one or more of the methodologies described herein may obviate a need for certain human efforts or resources that otherwise would be involved in generating a company profile page. Additionally, computing resources used by one or more machines, databases, or devices (e.g., within the network environment 100) may similarly be reduced. Examples of such computing resources include processor cycles, network traffic, memory usage, data storage capacity, power consumption, and cooling capacity.

Furthermore, by generating entity profiles, the social network system 210 can target ads specific to a company page based on the industry and member data.

Figure 6:
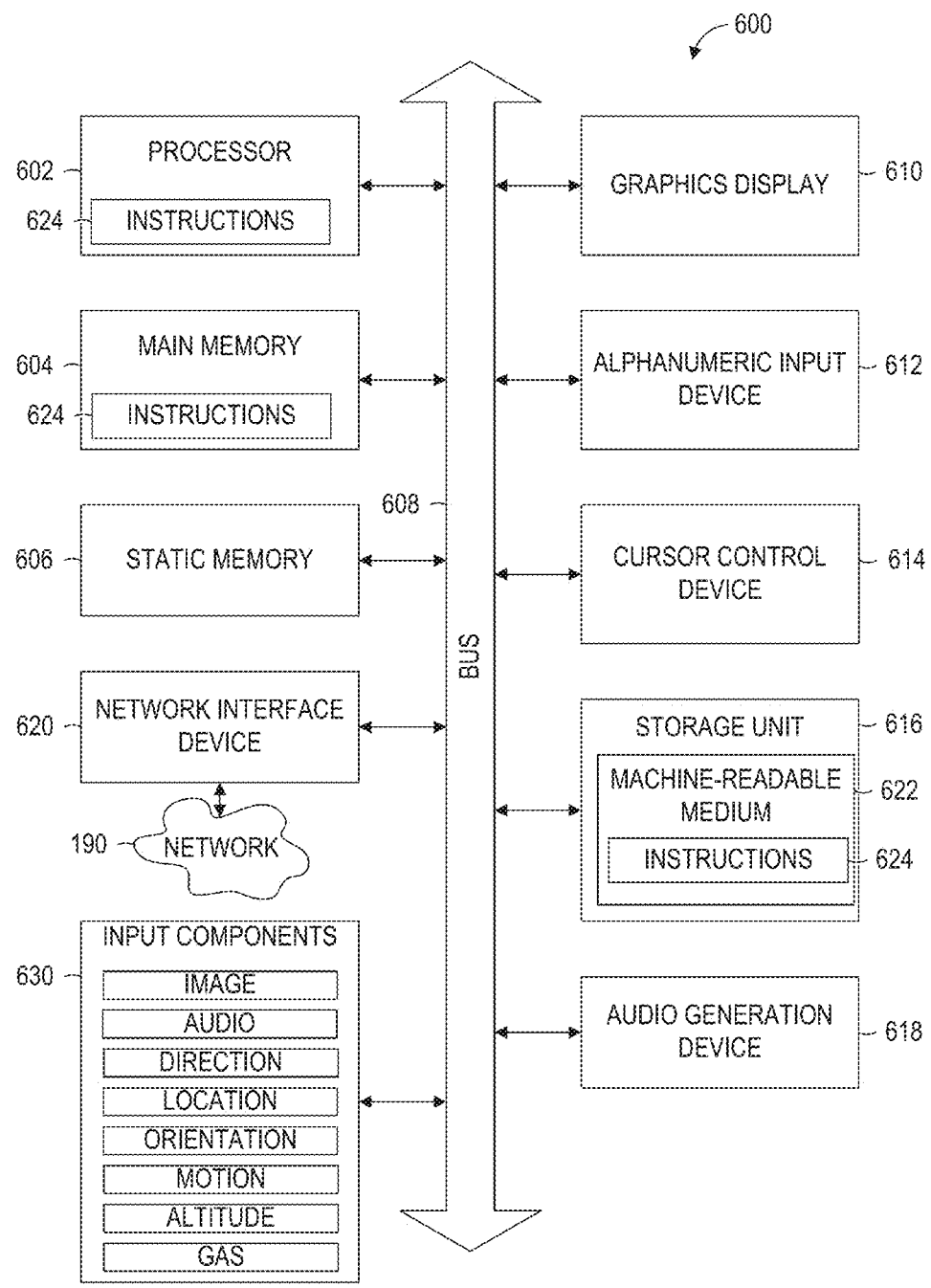
FIG. 6 is a block diagram illustrating components of a machine, according to some example embodiments, able to read instructions from a machine-readable medium and perform any one or more of the methodologies discussed herein.

FIG. 6 is a block diagram illustrating components of a machine 600, according to some example embodiments, able to read instructions 624 from a machine-readable medium 622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 6 shows the machine 600 in the example form of a computer system (e.g., a computer) within which the instructions 624 (e.g., software, a program, an application, an applet, an app, or other executable code) for causing the machine 600 to perform any one or more of the methodologies discussed herein may be executed, in whole or in part.

In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a distributed (e.g., peer-to-peer) network environment. The machine 600 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include any collection of machines that individually or jointly execute the instructions 624 to perform all or part of any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or another pointing instrument), a storage unit 616, an audio generation device 618 (e.g., a sound card, an amplifier, a speaker, a headphone jack, or any suitable combination thereof), and a network interface device 620.

The storage unit 616 includes the machine-readable medium 622 (e.g., a tangible and non-transitory machine-readable storage medium) on which are stored the instructions 624 embodying any one or more of the methodologies or functions described herein. The instructions 624 may also reside, completely or at least partially, within the main memory 604, within the processor 602 (e.g., within the processor's cache memory), or both, before or during execution thereof by the machine 600. Accordingly, the main memory 604 and the processor 602 may be considered machine-readable media (e.g., tangible and non-transitory machine-readable media). The instructions 624 may be transmitted or received over the network 190 via the network interface device 620. For example, the network interface device 620 may communicate the instructions 624 using any one or more transfer protocols (e.g., Hypertext Transfer Protocol (HTTP)).

In some example embodiments, the machine 600 may be a portable computing device, such as a smartphone or tablet computer, and may have one or more additional input components 630 (e.g., sensors or gauges). Examples of such input components 630 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 624 for execution by the machine 600, such that the instructions 624, when executed by one or more processors of the machine 600 (e.g., processor 602), cause the machine 600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    accessing, by a profile generation module operating on a server, employment data from a member profile of a first member in a social network, the employment data stored in a profile database;
    determining, by the profile generation module, an employer based on the accessed employment data;
    retrieving, by the profile generation module, a plurality of other member profiles in the social network listing the determined employer as an employer;
    calculating, by the profile generation module, a connection density among the member profile of the first member and the other member profiles;
    validating, by the profile generation module, that one or more members, including the first member, is an employee of the determined employer based on the connection density;
    verifying, by the profile generation module, that the determined employer does not have an existing entity profile in the social network;
    authenticating, by the profile generation module, the verified employer based on member data corresponding to the validated one or more members from the social network;
    generating, by the profile generation module, a web page comprising an entity profile for the authenticated employer using the member data corresponding to the validated one or more members;
    sending the generated web page from the profile generation module to an application server to cause a presentation of the generated entity profile in a user interface on the social network;
    using, by the profile generation module one or more machine-learning techniques to determine a member to request to manage the generated entity profile based on member title and based on member engagement value, wherein the member engagement value is based on member activity and behavior data; and
    transmitting a request, via the user interface, to the determined member to request to manage the generated entity profile, the request asking the determined member to act as an administrator of the generated entity profile.

2. The method of claim 1, wherein the generated entity profile includes an entity name of the employer, an entity location, a website associated with the employer, and an industry associated with the employer.

3. The method of claim 1, wherein the generating comprises forming a web page readable by a web browser.

4. The method of claim 1, wherein the authentication includes:
    calculating a member engagement value based on member activity and behavior data corresponding to the member profile, the member activity and behavior data having a number of page views in the social network; and
    authenticating the verified employer based on the generated engagement value.

5. The method of claim 1, wherein the authentication includes:
    calculating a member ranking score based on social graph data corresponding to the member profile, the social graph data having a number of connections; and
    authenticating the verified employer based on the generated engagement value.

17

6. The method of claim 1, further comprising:
calculating a confidence level for the verified employer, the confidence level corresponding to a probability that the member is an employee of the employer; and
wherein the verified employer is not authenticated when the confidence level is below a predetermined threshold.

7. The method of claim 1, wherein the verification includes:
determining that a website associated with the employer is not the same as a website associated with another entity profile in the social network.

8. The method of claim 1, wherein the verification includes:
determining that a company name and a location associated with the employer is not the same as a company name and a location associated with another entity profile in the social network.

9. A social network system comprising:
a first database storing member profile data and entity profile data;
a second database storing having social graph data;
a third database storing member activity and behavior data;
a server comprising one or more processors and implementing a profile generation module, an application server, and a user interface, the server configured to:
access, by a profile generation module operating on a server, employment data from a member profile of a first member in a social network, the employment data stored in a profile database;
determine, by the profile generation module, an employer based on the accessed employment data;
retrieve, by the profile generation module, a plurality of other member profiles in the social network listing the determined employer as an employer;
calculate, by the profile generation module, a connection density among the member profile of the first member and the other member profiles;
validate, by the profile generation module, that one or more members, including the first member, is an employee of the determined employer based on the connection density;
verify, by the profile generation module, that the determined employer does not have an existing entity profile in the social network;
authenticate, by the profile generation module, the verified employer based on member data corresponding to the validated one or more members from the social network;
generate, by the profile generation module, a web page comprising an entity profile for the authenticated employer using the member data corresponding to the validated one or more members;
send the generated web page from the profile generation module to an application server to cause a presentation of the generated entity profile in a user interface on the social network;
use, by the profile generation module one or more machine-learning techniques to determine a member to request to manage the generated entity profile based on member title and based on member engagement value, wherein the member engagement value is based on member activity and behavior data; and
transmit a request, via the user interface, to the determined member to request to manage the generated entity profile, the request asking the determined member to act as an administrator of the generated entity profile.

10. The system of claim 9, wherein the generated entity profile includes an entity name of the employer, an entity location, a website associated with the employer, and an industry associated with the employer.

11. The system of claim 9, wherein the generated entity profile includes a list of member profiles belonging to employees of the employer.

12. The system of claim 9, wherein the one or more processors are further configured to:
calculate a member engagement value based on member activity and behavior data corresponding to the member profile, the member activity and behavior data having a number of page views in the social network; and
authenticate the verified employer based on the generated engagement value.

13. The system of claim 9, wherein the one or more processors are further configured to:
calculate a member ranking score based on social graph data corresponding to the member profile, the social graph data having a number of connections; and
authenticate the verified employer based on the generated engagement value.

14. The system of claim 9, wherein the one or more processors are further configured to:
calculate a confidence level for the verified employer, the confidence level corresponding to a probability that the member is an employee of the employer; and
wherein the verified employer is not authenticated when the confidence level is below a predetermined threshold.

15. The system of claim 9, wherein the one or more processors are further configured to:
determine that a website associated with the employer is not the same as a website associated with another entity profile in the social network.

16. A non-transitory machine-readable storage medium comprising instructions that, when executed by one or more processors of a machine, cause the machine to perform operations comprising:
accessing, by a profile generation module operating on a server, employment data from a member profile of a first member in a social network, the employment data stored in a profile database;
determining, by the profile generation module, an employer based on the accessed employment data;
retrieving, by the profile generation module, a plurality of other member profiles in the social network listing the determined employer as an employer;
calculating, by the profile generation module, a connection density among the member profile of the first member and the other member profiles;
validating, by the profile generation module, that one or more members, including the first member, is an employee of the determined employer based on the connection density;
verifying, by the profile generation module, that the determined employer does not have an existing entity profile in the social network;
authenticating, by the profile generation module, the verified employer based on member data corresponding to the validated one or more members from the social network;
generating, by the profile generation module, a web page comprising an entity profile for the authenticated employer using the member data corresponding to the validated one or more members;

sending the generated web page from the profile generation module to an application server to cause a presentation of the generated entity profile in a user interface on the social network;

using, by the profile generation module one or more machine-learning techniques to determine a member to request to manage the generated entity profile based on member title and based on member engagement value, wherein the member engagement value is based on member activity and behavior data; and transmitting a request, via the user interface, to the determined member to request to manage the generated entity profile, the request asking the determined member to act as an administrator of the generated entity profile.

* * * * *